Patented Sept. 9, 1952

2,609,882

UNITED STATES PATENT OFFICE 2,609,882

COMPOSITION FOR CEMENTING WELLS

Bryan E. Morgan and George K. Dumbauld, Houston, Tex., assignors, by mesne assignments, to Standard Oil Development Company, Elizabeth, N. J., a corporation of Delaware No Drawing. Application August 31, 1950, Serial No. 182,622

14 Claims. (Cl. 166—22)

The present invention is directed to an improved composition for cementing wells. More particularly, the invention is directed to a composition adapted for use in cementing wells in which drilling mud containing additives which adversely affect the setting of cement is employed.

The present invention involves a cementing composition comprising Portland cement and an effective amount of an activated carbon. The composition may be formed as a dry mixture of Portland cement and an activated carbon or it may be formed as an aqueous slurry of Portland cement and an activated carbon.

The amount of activated carbon employed in the composition of the present invention will range from 0.5% to 10% by weight based on the dry cement. Some leeway in these ranges may be allowed but ordinarily it will be undesirable to use more than 10% by weight based on the dry cement of the activated charcoal, since the use of charcoal in large quantities, such as 20% addition, necessitates an increase in the water-to-cement ratio in order to keep the consistency such that the slurry can be easily handled by pumps. The increased water-to-cement ratio offsets the advantages of the increased amounts of charcoal and, therefore, it will be undesirable to use over 10% to 15% by weight of activated carbon based on the dry cement. The preferred range is between 0.5% and 5% by weight.

The activated carbon employed in the practice of the present invention is preferably activated coconut charcoal, but there are many activated carbons which may be employed in lieu thereof. The activated carbon may be prepared from various raw materials such as cane sugar, kelp, bagasse, coal, lignite, peat, sawdust, charcoal, rice hulls, corn cobs, molasses, carbonized sulfuric acid sludge resulting from the acid treatment of petroleum products, carbonized materials from cellulose manufacture, bone, and even from blood. In short, the activated carbon may be prepared from numerous materials. Reference to methods of activation may be found in Hassler's "Active Carbon, The Modern Purifier," Githens-Sohl Corporation, New York, copyright, 1941 by Industrial Chemical Sales Division, West Virginia Pulp and Paper Company.

The particle size of activated carbon employed in the present invention may be in the range between 30 and 300 mesh; however, the preferred particle size range is between 80 and 200 mesh. The preferred method of adding the activated carbon is to pre-mix it with the dry cement before transporting the mixture to the well site, and then to mix the dry components with water to form a slurry in a conventional manner.

The amount of water employed in the composition of the present invention will be an amount sufficient to form a pumpable slurry with the admixture of cement and activated carbon. This amount of water will vary depending on the type of cement and activated carbon used, but ordinarily will be in the range from 40% to 60% by weight based on the dry cement. Neat slurries suitable for well cementing purposes usually contain from about 40% to 55% water based on the weight of dry cement.

The composition of the present invention is designed to be employed in well drilling operations and particularly in oil well drilling operations employing a drilling fluid or mud, such as described in U. S. Patent 2,109,858, issued March 1, 1938, to George E. Cannon. In the Cannon patent there is described and claimed drilling fluids containing caustic alkali and various tannin material and particularly caustic soda and quebracho material. The patentee, Cannon, has set out many tannin-containing materials which may be used in the drilling fluid. The drilling fluid proposed by Cannon has been widely adopted in the industry but in some cases difficulty has been experienced in cementing boreholes containing drilling fluid treated as taught in the Cannon patent. For example, the drilling mud containing treating materials may become admixed with the cement slurry and delay its ability to set rapidly. This may result in a serious delay in drilling operations. Furthermore, the cementing job may be rendered ineffective because of contamination of the cement slurry with the drilling mud containing additives which adversely affect setting of the cement. This contamination occurs during the placement of the cement slurry in the borehole and is the result of the admixing of the cement slurry and the drilling mud as the drilling mud is displaced by the cement slurry in the casing and in the annulus between the casing and the borehole.

We have found that the deleterious effects of drilling mud containing various additives such as caustic soda and quebracho, starch, calcium lignosulfonate, and carboxymethyl cellulose upon cement slurries may be eliminated or substantially reduced by the addition of activated carbon to the cement. Particularly we have found that activated coconut charcoal is effective in offsetting the deleterious effects on the cement of the several additives for drilling mud mentioned above.

In order to illustrate the invention, activated coconut charcoal was admixed with dry Portland cement and the admixture then formed into slurries with water. The admixtures of activated coconut charcoal and cement after being formed into a slurry were then contaminated with a laboratory-prepared 6% bentonitic clay drilling fluid containing 3.6 lbs. of quebracho and 3.6 lbs. of caustic soda per barrel. The activated coconut charcoal employed in these compositions had a particle size range between 80 and 150 mesh. The compositions were tested for consistency in a Stormer viscosimeter, and portions of the compositions were poured into briquette molds which were placed under water at 175° F. The briquettes were removed after one and seven days of curing and tested for tensile strength in accordance with the ASTM procedure C190-44.

The amount of activated charcoal, the water to cement ratio employed in the slurries, the amount of mud contamination, the consistency and the tensile strength of the compositions are set out in the following Table I:

*Table I*

| Coconut Charcoal Added, Percent by Weight of Dry Cement | Water-to-Cement Ratio of Slurry, grams Water/100 grams Cement | Mud Contamination, cc. Mud/100 cc. Slurry | Consistency, R.P.M. at 400 gms. Stormer | Tensile Strength lbs./sq. in. | |
|---|---|---|---|---|---|
| | | | | 1 Day | 7 Days |
| 0 | 40 | 0 | 750 | 331 | 525 |
| 0 | 40 | 20 | 1,090 | ¹0 | 313 |
| 5 | 43 | 0 | 720 | 363 | 520 |
| 5 | 43 | 20 | 1,090 | 123 | 362 |

¹ Not set after 2 days.

From the foregoing data shown in the table, it will be apparent that contamination of the cement slurry with a drilling mud treated with caustic and quebracho delayed the strength development of the cement and that this effect was counteracted successfully by the addition of activated coconut charcoal to the dry cement prior to forming the slurry. These data show that a cement slurry containing 5% activated coconut charcoal developed a tensile strength of 123 lbs. per sq. in. after one day, even though it was contaminated with heavily treated caustic-quebracho mud, where as the neat or reference cement slurry contaminated similarly had not developed any strength at the end of two days. The addition of activated coconut charcoal caused no serious changes in the strength development of the uncontaminated slurry.

These data are presented to illustrate the usefulness of this invention and are not intended to restrict its use to wells wherein the drilling fluid is treated exclusively with caustic alkali and tannin-containing materials. Thus, the drilling fluid may contain other treating agents which adversely affect the setting of cement, in lieu of caustic and tannin, such as starches, celluloses, calcium lignosulfonate, carboxymethyl cellulose, aromatic sulfonic acid derivatives, and the like.

To illustrate the effect of various organic additives in drilling muds as contaminants in cementing oil wells, a number of compositions were made up in which activated coconut charcoal was admixed with dry cement and the admixture then formed into slurries with water. The admixture of activated coconut charcoal and cement after being made into a slurry was then contaminated with drilling muds which had been treated separately with sodium hydroxide-quebracho, starch, calcium lignosulfonate, and carboxymethyl cellulose. These muds were prepared by adding the chemicals mentioned above to an untreated field mud obtained from a well being drilled near Pierce Junction, Texas. The activated coconut charcoal employed in these tests had a particle size range between 80 and 200 mesh. The compositions were placed in briquette molds, cured under water at 175° F., and then tested for tensile strength in accordance with the ASTM procedure C190-44. The tensile strength results are reported along with other pertinent test data in Table II.

*Table II*

| Coconut Charcoal Added, percent by weight of Dry Cement | Water-to-Cement Ratio of Slurry, grams Water per 100 grams Cement | Mud Contamination, cc. Mud/100 cc. Cement Slurry | Treating Agent in Added Mud | Concentration of Treating Agent in Mud, lbs/bbl. | Tensile Strength, lbs./sq. in. | |
|---|---|---|---|---|---|---|
| | | | | | 1 Day | 2 Days |
| 0 | 40 | 20 | Sodium Hydroxide-Quebracho | 4 | 0 | 0 |
| 5 | 40 | 20 | ...do... | 4 | ¹108 | |
| 0 | 40 | 20 | Starch | 10 | 0 | 160 |
| 5 | 40 | 20 | ...do... | 10 | 103 | 250 |
| 0 | 40 | 20 | Calcium Lignosulfonate | 12 | 0 | ²0 |
| 5 | 40 | 20 | ...do... | 12 | 0 | 102 |
| 0 | 40 | 20 | Carboxymethylcellulose | 5 | 50 | |
| 5 | 40 | 20 | ...do... | 5 | 118 | |

¹ Tested at end of 30 hours.
² Had not set after 4 days.

From the data reported in Table II it is evident that 5% coconut charcoal based on the dry cement was effective in reducing the deleterious effects of the several additives in drilling mud with which the cement slurry was deliberately contaminated. The data further show that the addition of the coconut charcoal allows the cement slurry to set and to obtain an appreciable strength within a reasonable time even when contaminated with substantial quantities of mud containing the various additives.

In order to illustrate further the practice of the present invention, a number of cement slurries contaminated with caustic-qebracho mud were prepared for observation. One was tested without charcoal; the others contained coconut charcoal in amounts ranging from .2% to 20% by weight based on the dry cement. The results of tensile strength measurements made on these compositions after they had cured under water at 175° F. are presented in Table III.

*Table III*

| Coconut Charcoal Added, percent by weight of Dry Cement | Water-to-Cement Ratio of Slurry, grams Water/100 grams Cement | Mud Contamination,[1] cc. Mud/100 cc. Cement Slurry | Tensile Strength, lbs/sq. in. | |
|---|---|---|---|---|
| | | | 1 Day | 2 days |
| 0.0 | 40 | 20 | 0 | [2] 0 |
| 0.2 | 40 | 20 | 0 | [2] 0 |
| 0.5 | 40 | 20 | 0 | 165 |
| 1.0 | 40 | 20 | 0 | 168 |
| 5.0 | 40 | 20 | [3] 108 | |
| 10.0 | 43 | 20 | 112 | |
| 20.0 | 50 | 20 | 73 | |

[1] An untreated field mud from Pierce Junction, Texas, to which 4 lbs. sodium hydroxide and 4 lbs. quebracho per bbl. had been added.
[2] Had not set after 4 days.
[3] Test made at end of 30 hours.

From the data presented in Table III, it will be seen that 0.5% coconut charcoal by weight of the dry cement was effective in counteracting the retardation of set of a cement slurry contaminated with a heavily treated caustic-quebracho mud but that 0.2% was not effective. A composition containing no charcoal and one containing 0.2% charcoal by weight of cement both failed to set within four days, whereas a composition containing 0.5% charcoal by weight of cement developed a tensile strength of 165 lbs. per sq. in. within two days. Furthermore, the best results were obtained when activated coconut charcoal was added in the amount of 10% by weight of dry cement. It is believed that the decrease of tensile strength at one day which resulted from addition of 20% charcoal was caused by the increased water-to-cement ratio of the slurry. It was necessary to use a higher water content when 20% charcoal was employed in order to maintain about the same slurry consistency as the other slurries containing smaller amounts of charcoal. It is postulated that the beneficial effect of the increased concentration of charcoal is offset by the dilution effect of the additional water; therefore, it appears that about 10% charcoal by weight of dry cement gives the maximum results. However, the most practical concentration appears to be between 0.5% and 5% by weight of dry cement.

While the mud employed in the cement composition shown in Table III was treated with caustic and quebracho, it will be apparent that the tests on these compositions were comparable to similar tests on compositions that were contaminated with mud containing other additives. For example, the results presented in Table II for 5% charcoal show that the composition contaminated with mud containing caustic-quebracho developed a tensile strength of 108 lbs. per sq. in. after 30 hours, the composition contaminated with mud containing starch developed a tensile strength of 103 lbs. per sq. in. after 24 hours, and the composition contaminated with mud containing carboxymethyl cellulose developed a tensile strength of 118 lbs. per sq. in. after 24 hours.

Table IV presents data showing the effect of activated charcoal on the strength development of uncontaminated slurries prepared from commercial Portland cement. These slurries were cured under water at 175° F. and the tensile strengths were measured after one, seven, and thirty days, respectively.

*Table IV*

| Coconut Charcoal Added, percent by weight of Dry Cement | Water-to-Cement Ratio of Slurry, grams Water/100 grams Cement | Tensile Strength, lbs./sq. in. | | |
|---|---|---|---|---|
| | | 1 Day | 7 Days | 30 Days |
| 0 | 40 | 195 | | 570 |
| 5 | 40 | 272 | | 573 |
| 5 | 45 | 148 | 515 | |

The data in Table IV show that addition of activated coconut charcoal does not impair the strength development of cements for use in oil well drilling operations. At the same water-to-cement ratio (40% slurry) the addition of 5% activated coconut charcoal increased the one-day strength and had no effect on the thirty-day strength. At a higher water-to-cement ratio (45% slurry), the one-day strength was lower because of increased water-to-cement ratio.

From the data in Table IV it may be concluded that for a given water-to-cement ratio the addition of activated carbon such as coconut charcoal increased the early strength development of the cement slurry because the presence of the activated charcoal reduced the water-to-solid ratio. When the water-to-cement ratio is increased to a 45% slurry, this effect was overcome by the additional amount of water and a reduced one-day strength was obtained as a normal result of the increased water content of the slurry.

Since a well cementing composition must remain fluid long enough to be pumped into place, tests were made to determine the effect of activated coconut charcoal on the pumpability time of a Portland cement slurry. Activated coconut charcoal was added to dry Portland cement and slurries were formed; tests were made on these slurries in a Stormer viscosimeter and a Halliburton consistometer.

The results of these tests are given in Table V. The Stormer viscosimeter results may be used to indicate the consistency of cement slurries and the Halliburton consistometer is used to test the pumpability time of cement slurries.

*Table V*

| | | |
|---|---|---|
| Charcoal Added, percent by weight of Dry Cement | 0 | 5 |
| Water-to-Cement Ratio of Slurry, grams Water/100 grams Cement | 40 | 43 |
| Consistency, R. P. M. at 400 grams Stormer | 750 | 730 |
| Halliburton Consistometer Time to Pumpability Limit, hours | 4½ | 6 |

It is evident from these data that for slurries of approximately equal consistency the presence of 5% charcoal did not impair the pumpability property of the cement. In fact, the 43% slurry containing the charcoal had a Halliburton pumpability time somewhat greater than that of the 40% neat slurry.

In summary, it will be apparent from the data in Tables IV and V that cement slurries containing activated charcoal are satisfactory for well cementing.

While the primary purpose of the present invention is improvement in oil well cementing operations, actually the invention is not to be limited to such. In construction operations where concrete mixtures are prepared from Portland cement, sand, and aggregate, it is frequently necessary to wash the sand to remove therefrom organic matter. The sand may be contaminated with humus which may deleteriously affect the strength development of the cement. It is, therefore, contemplated that the present invention may be employed in preparing compositions useful in construction operations which include Portland cement, sand containing organic matter, and activated carbons, such as those of the type described before. Specifically, it is contemplated that compositions containing Portland cement, dirty sand containing organic matter, aggregate, and activated charcoal may be employed in construction operations. The amount of activated carbon or charcoal to be employed in such compositions will range from 0.5% by weight to about 10% by weight based on the dry cement in the composition, it being understood that water will be added to the dry composition including the activated carbon or that a mixture may be formed including the cement, sand, and aggregate to which the activated carbon or charcoal may be added.

The nature and objects of the present invention having been fully described and illustrated, what we wish to claim as new and useful and to secure by Letters Patent is:

1. A composition adapted for use in cementing wells in which a drilling mud containing an additive adversely affecting setting of cement is employed which comprises Portland cement and an amount in the range between 0.5% and 10% by weight of an activated charcoal based on the dry cement.

2. A composition adapted for use in cementing wells in which a drilling mud containing an additive adversely affecting setting of cement is employed which comprises Portland cement and an amount in the range between 1% and 5% by weight of activated charcoal based on the dry cement.

3. A composition adapted for use in cementing wells in which a drilling mud containing an additive adversely affecting setting of cement is employed which comprises a pumpable aqueous slurry of Portland cement and an amount in the range between 0.5% and 10% by weight of activated coconut charcoal based on the dry cement.

4. A composition adapted for use in cementing wells in which a drilling mud containing an additive adversely affecting setting of cement is employed which comprises Portland cement and an amount in the range between 0.5% and 10% by weight of activated charcoal based on the dry cement having a particle size in the range between 30 and 300 mesh.

5. A composition adapted for use in cementing wells in which a drilling mud containing an additive adversely affecting setting of cement is employed which comprises Portland cement and an amount in the range between 1% and 5% by weight based on the dry cement of activated coconut charcoal having a particle size in the range between 80 and 200 mesh.

6. A composition adapted for use in construction operations which comprises Portland cement, sand containing organic matter, and an amount in the range between 0.5% and 10% by weight based on the dry cement of an activated charcoal.

7. A composition in accordance with claim 6 in which the activated charcoal is activated coconut charcoal.

8. A composition adapted for use in construction operations which comprises a concrete mixture of Portland cement, sand containing organic matter, water and an amount in the range between 0.5% and 10% by weight based on the dry cement of activated charcoal.

9. A composition in accordance with claim 8 in which the activated charcoal is activated coconut charcoal.

10. In the method of cementing a casing in a well which comprises pumping down through the casing and upwardly into the annular space between the casing and the borehole an aqueous inorganic cement slurry containing from 0.5% to 10.0% by weight of activated charcoal based upon the dry cement in the slurry.

11. In the method of cementing a casing in a well in which a drilling mud containing an additive adversely affecting setting of cement is employed which comprises pumping down through the casing and upwardly into the annular space between the casing and the borehole an aqueous inorganic cement slurry containing from 0.5% to 10.0% by weight of activated charcoal based on the dry cement in the slurry.

12. A method in accordance with claim 11 in which the activated charcoal is activated coconut charcoal.

13. The method of cementing a well drilled into subsurface formations which comprises pumping into the well an aqueous inorganic cement slurry containing from 0.5% to 10% by weight of activated charcoal based on the dry cement in the slurry.

14. The method of forming a cement plug in a well drilled into subsurface formations wherein a drilling mud containing an additive adversely affecting setting of cement has been employed which comprises introducing into said well an aqueous inorganic cement slurry containing from 0.5% to 10% by weight of activated charcoal based upon the dry cement in the slurry.

BRYAN E. MORGAN.
GEORGE K. DUMBAULD.

REFERENCES CITED

The following references are of record in the file of this patent:

UNITED STATES PATENTS

| Number | Name | Date |
| --- | --- | --- |
| 1,140,124 | Dalen | May 18, 1915 |
| 1,972,207 | Tucker | Sept. 4, 1934 |
| 2,324,990 | Carter | July 20, 1943 |